United States Patent
Crews

(10) Patent No.: US 8,682,037 B2
(45) Date of Patent: Mar. 25, 2014

(54) METHOD AND SYSTEM FOR THINNING A POINT CLOUD

(75) Inventor: John T Crews, Dallas, TX (US)

(73) Assignee: Ratheon Company, Waltham, MA (US)

( * ) Notice: Subject to any disclaimer, the term of this patent is extended or adjusted under 35 U.S.C. 154(b) by 293 days.

(21) Appl. No.: 13/193,751

(22) Filed: Jul. 29, 2011

(65) Prior Publication Data

US 2013/0028482 A1    Jan. 31, 2013

(51) Int. Cl.
*G06K 9/00* (2006.01)
(52) U.S. Cl.
USPC .......................................................... 382/106
(58) Field of Classification Search
USPC ............................ 382/106; 345/419; 702/150
See application file for complete search history.

(56) References Cited

U.S. PATENT DOCUMENTS

2008/0192228 A1 * 8/2008 Eaton ........................... 356/5.01

OTHER PUBLICATIONS

Cho, Peter et al., "Real Time 3D Ladar Imaging", Lincoln Library Journal, vol. 16, No. 1, 2006, p. 1-18.

* cited by examiner

*Primary Examiner* — Amara Abdi
(74) *Attorney, Agent, or Firm* — Cantor Colburn LLP

(57) ABSTRACT

A system and method for thinning a point cloud. In one aspect of the method, the point cloud is generated by an imaging device and data points are thinned out of the point cloud based upon their distance from the imaging device.

12 Claims, 4 Drawing Sheets

METHOD AND SYSTEM FOR THINNING A POINT CLOUD

TECHNICAL FIELD

This disclosure relates to a method and system for thinning a point cloud. More specifically, this disclosure relates to a method and system for thinning a point cloud based upon the distance between the data points in the point cloud and the point of view of the imaging device used to generate the point cloud.

BACKGROUND OF THE INVENTION

A point cloud is a collection of three-dimensional points. Viewing point clouds is preferably done in a pseudo-three dimensional format displayed on a computer screen. It is further preferable to view point clouds in an interactive manner so the user can change the orientation of the data relative to the user's point of view in real time. However, point clouds with large numbers of elements strain the capabilities of computers to represent the elements of a point cloud in a responsive manner. When hardware capabilities have been reached, the only option is to remove points from the data cloud for display. The goal is to remove enough points to achieve acceptable performance while retaining enough points to provide visual detail to the user.

Imaging sensors such as laser radar sensors (LADARs) and light detection and ranging sensors (LIDARs) acquire point clouds of a scene. These data sets can be quite large, requiring significant amounts of computing resources to process. Thus, attempts have been made to thin these point clouds to reduce the set of data points that need to be worked with for a given task.

One prior method for thinning a point cloud involves removing points by a pattern (i.e. every nth point) or randomly. FIG. 1 depicts such a method. Under this approach, random points, or scattered points, are removed from the point cloud. This approach may omit important detail and may also introduce unwanted artifacts into the display.

Another prior method for thinning a point cloud involves segmenting the display into distinct tiles. Each tile then represents groups of data points at various levels of detail. Eyeglass (MIT Lincoln Laboratories) is an application for viewing point clouds using such a tiled approach. See generally "Real-Time 3D Ladar Imaging," *Lincoln Laboratory Journal*, Vol. 16, Number 1, 2006, the disclosure of which is hereby incorporated by reference herein. An example of a point cloud thinned using the tile method is depicted in FIG. 2. Tiles 10a, 10b, and 10d, which appear closer to the user's perspective 20 may be thinned less than (and thus include more detail) than tiles placed further away (i.e. 10c, 10e, and 10f). This approach has the disadvantage of possibly omitting detailed data near the user. Additionally, the tile boundaries appear in the display.

Hence, there exists a need in the industry to overcome these problems and provide a method and system for thinning a point cloud. Additionally, there exists a need in the industry to thin a point cloud based upon the distance of the respective points in the point cloud from a point of view of the imaging device used to generate the point cloud.

SUMMARY OF THE INVENTION

According to one embodiment of the present disclosure, a method for thinning a point cloud is disclosed. In one aspect, data points from the point cloud are excluded from the thinned point cloud based upon their distance from the point of view of the imaging device used to generate the point cloud. In another aspect, data points closest to the point of view are generally included in the thinned point cloud. In another aspect, data points furthest from the point of view are generally excluded from the thinned point cloud. In another aspect, data points further from the user are gradually thinned until the furthest extents of the data are very sparse.

An advantage of one embodiment of the disclosure may be the ability to keep large amounts of detail which are close in relation to the user's or imaging device's perspective.

Another advantage of one embodiment of the disclosure may be the ability to exclude a large amount of detail further away from the user's or imaging device's perspective.

Another advantage of one embodiment of the disclosure may be to thin the point cloud while retaining high detail near the user's apparent point of view.

Various embodiments of the disclosure may have none, some, or all of these advantages. Other technical advantages of the present disclosure may also be readily apparent to one skilled in the art.

BRIEF DESCRIPTION OF THE DRAWINGS

For a more complete understanding of the present disclosure and its advantages, reference is now made to the following descriptions, taken in conjunction with the associated drawings, in which.

DETAILED DESCRIPTION OF THE DRAWINGS

The disclosed system relates to a system and method 100 for thinning a point cloud 10. In one aspect of the disclosure, data points in a point cloud 10 are thinned, or removed, based upon their distance from a point of view 20 of the imaging device.

Imaging sensors such as LADARs acquire point clouds of a scene. The point clouds of the scene are then image processed to generate three dimensional (3D) models of the actual environment of the scene. The image processing of the 3D models enhance the visualization and interpretation of the scene. Typical applications include surface measurements in airborne and ground-based industrial, commercial and military scanning applications such as site surveillance, terrain mapping, reconnaissance, bathymetry, autonomous control of navigation and collision avoidance and the detection, ranging, and recognition of remote military targets.

Presently, there exist many types of LADARs for acquiring point clouds of a scene. A point cloud acquired by a LADAR typically comprise x, y & z data points from which range to target, two spatial angular measurements and strength (i.e., intensity) may be computed. Various LADARs exist for acquiring point clouds and include, by example only, arrays of avalanche photodiodes (APD).

Figure 1:
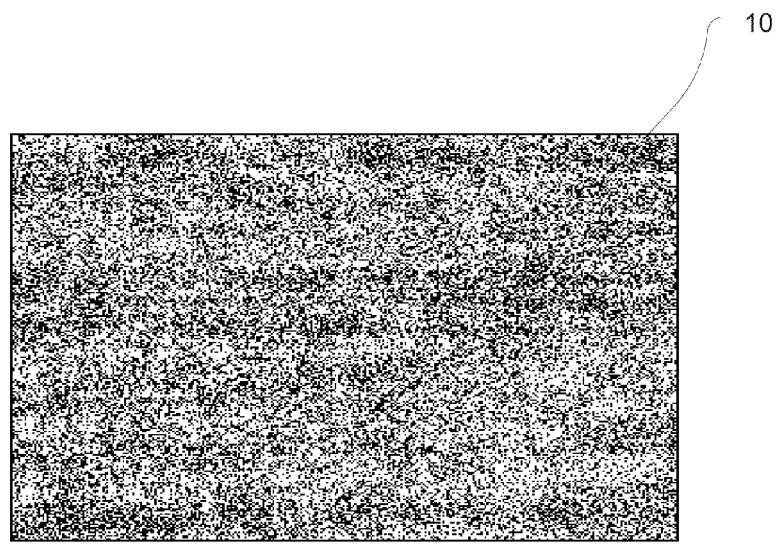
FIG. 1 depicts a point cloud thinned via even removal of random points.
Figure 2:
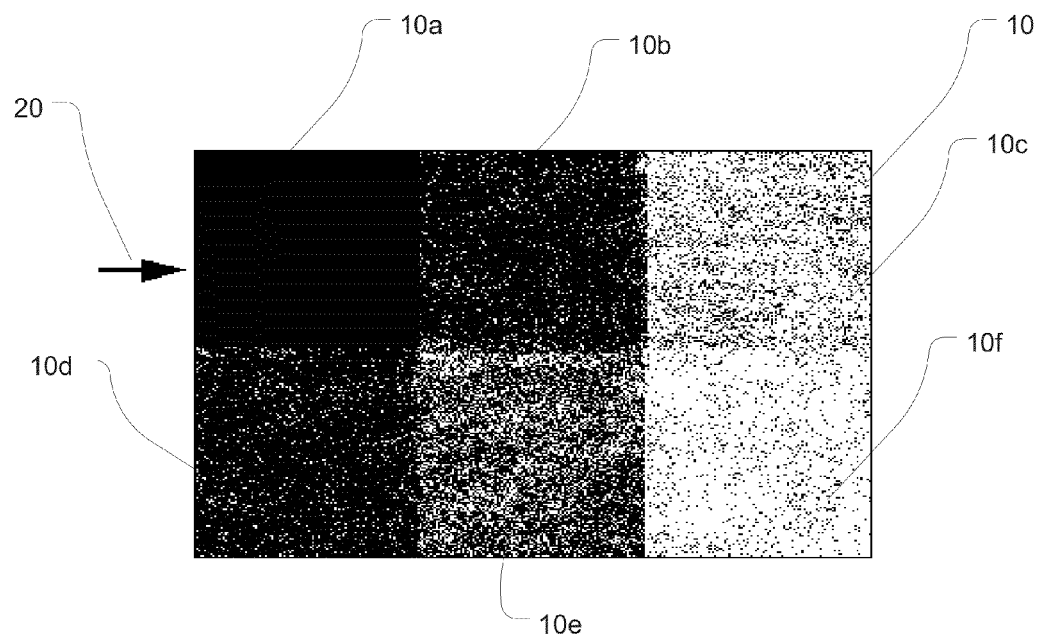
FIG. 2 depicts a point cloud thinned via a tile method.
Figure 3:
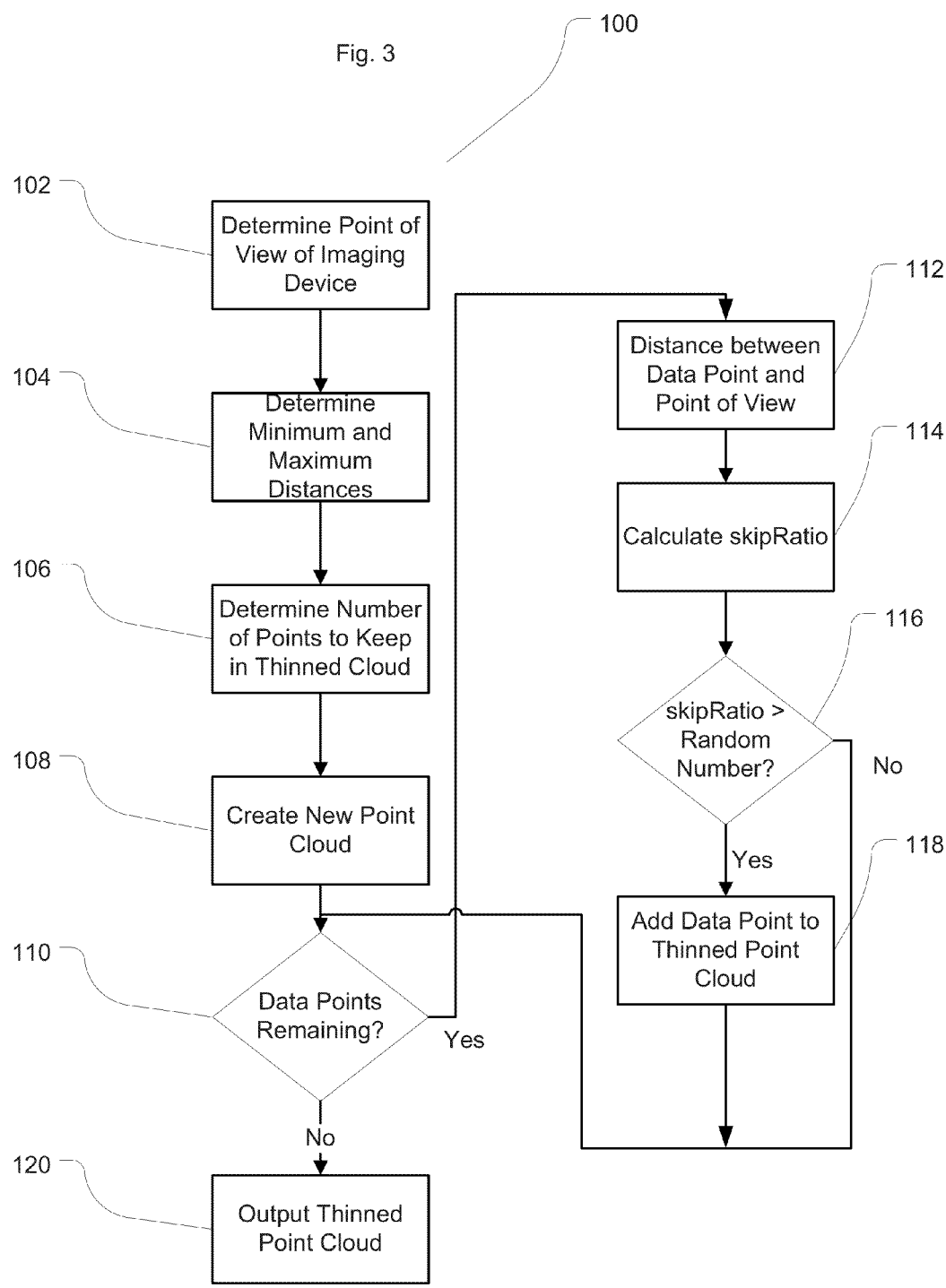
FIG. 3 is a flow chart illustrating one embodiment of a series of steps that may be performed in accordance with the teachings of the present disclosure.

FIG. 3 discloses steps that may be performed in an embodiment of the present disclosure. The method 100 begins at step 102 by determining a point of view of the imaging device. The imaging device may be any imaging device capable of capturing a scene or image, and particularly those imaging devices which generate a point cloud to represent the scene captured.

Once the point of view 20 of the imaging device has been determined, the method 100 continues by calculating an outer bound and inner bound of all data points within the point cloud 10. This is depicted at step 104 where the method 100 determines the minimum distance (i.e. the distance between the point of view 20 and the nearest data point) and the maximum distance (i.e. the distance between the point of view 20 and the furthest data point in the point cloud 10).

The method 100 may also determine an appropriate number of points to keep in the thinned point cloud. Various factors may be considered in this determination. For example, the method 100 may control the number of points to include in the thinned point cloud based upon available computing resources, such as the amount of memory available on the computer system. Alternatively, a configurable amount of memory may be preset in order to control the growth of both the thinned point cloud and the application used to process it.

In one embodiment, the number of points to keep in the thinned cloud is computed using the following formula:

numKeep=numPoints/freeMemory/constant(1)

In this formula, numPoints represents the total number of points in the original point cloud, freeMemory represents the available memory in the computing system, and constant(1) represents a constant number.

Turning to step 108, the method 100 next generates an empty thinned point cloud. As discussed below, a subset of data points from the point cloud 10 will be selected and included in the thinned point cloud. In an alternate embodiment, rather than generate a second point cloud and duplicate data points, the method 100 may discard data points from the point cloud enabling in place performance of the method 100.

Steps 110 through 118 represent a looping that may be performed by a method 100 in accordance with the present teaching. In this loop, each data point in the point cloud is analyzed. The method 100 may then make a determination for each data point as to whether or not it is included in the thinned point cloud.

In a preferred embodiment, the method 100 may calculate the distance between the subject data point and the point of view 20. This distance may then be used in calculating a skipRatio at step 114. The skipRatio is a measurement of whether or not the data point should be skipped (i.e. not included in the thinned point cloud). In one embodiment, the skipRatio is a number between 0 and 1 where 0 indicates the data point should be skipped (i.e. not included in the thinned point cloud) and 1 indicates the data point should not be skipped (i.e. included in the thinned point cloud).

Preferably, the skipRatio is calculated so as to make data points further from the point of view 20 more likely to be excluded from the thinned point cloud. Similarly, the skipRatio is preferably calculated to make data points closer to the point of view 20 more likely to be included in the thinned point cloud. In one embodiment, the skipRatio is computed using the following formula:

$$skipRatio = \frac{(d^2 - minDistance^2)}{\Delta Distance^2} \times numKeep \times constant \quad (2)$$

In the above formula, ΔDistance is calculated using the following formula:

$$\Delta Distance^2 = maxDistance^2 - minDistance^2$$

Here, minDistance represents the distance between the closest data point and the point of view 20, maxDistance represents the distance between the furthest data point and the point of view 20, numKeep represents the number of points to keep in the thinned cloud, and constant(2) represents a constant number.

Thus, as the distance of the data point in question gets further away from the point of view 20, the skipRatio is more likely to be closer to 1, and thus the data point is more likely to be excluded from the point cloud. Similarly, as the distance gets closer to the point of view 20, the skipRatio is more likely to be closer to 0, and thus the data point is more likely to be included in the thinned point cloud.

Next, at step 116, the skipRatio is compared against a random number. This comparison step 116 helps guard against clustering of data in the thinned point cloud.

Finally, at step 118 if the skipRatio is greater than the random number, the data point will be included in the thinned point cloud. If not, it will be excluded. The method 100 then continues back to step 110 with the next data point. Once all data points have been analyzed, the method 100 outputs the thinned point cloud at step 120.

Figure 4:
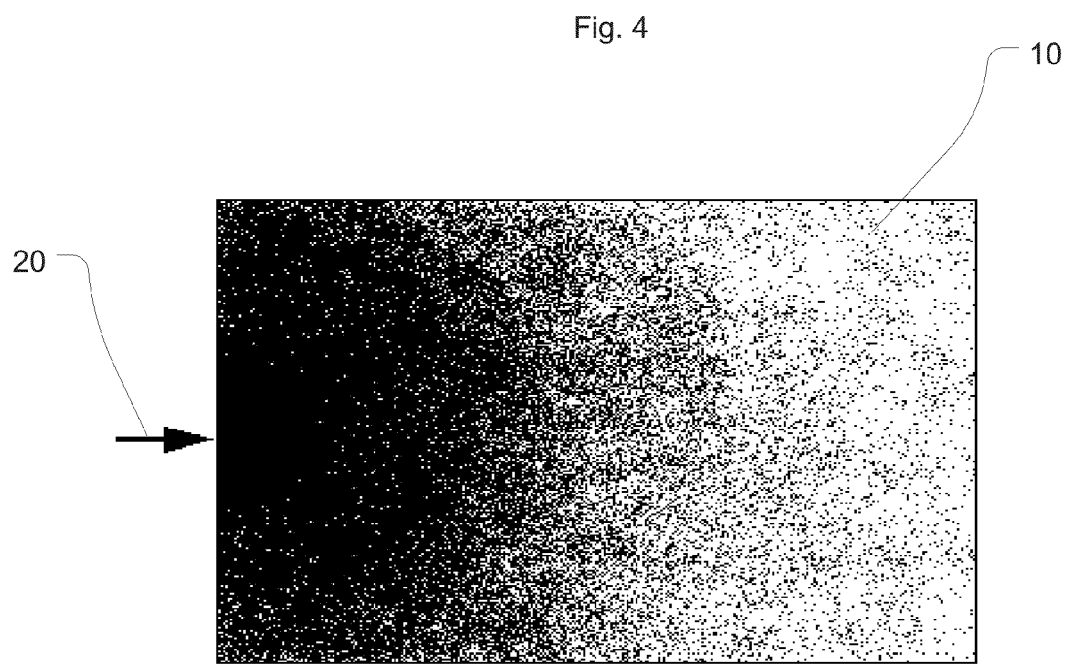
FIG. 4 depicts a point cloud thinned in accordance with the teachings of the present disclosure.

FIG. 4 depicts a point cloud 10 thinned in accordance with the present disclosure. The point of view 20 is depicted at the left side of the figure. As shown, the number of points in the thinned point cloud 10 is significantly greater closer to the point of view 20.

Figure 5:
FIG. 5 depicts a point cloud thinned via even removal of random points.
Figure 6:
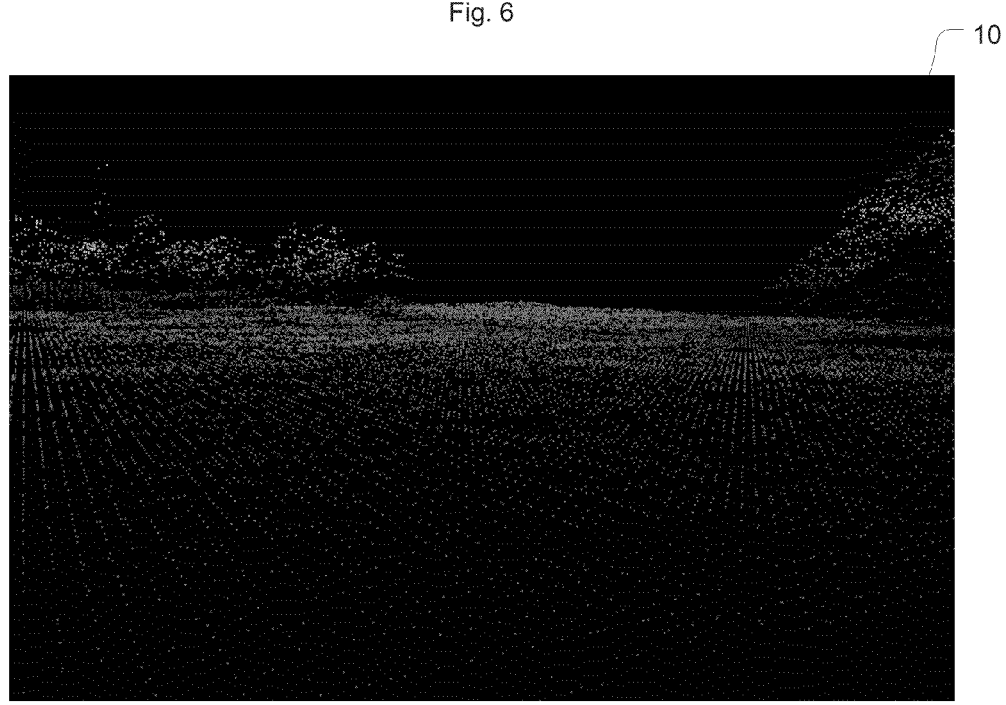
FIG. 6 depicts a point cloud thinned in accordance with the teachings of the present disclosure.

FIGS. 5 and 6 depict the same point cloud 10 thinned through different methods. In FIG. 5, the prior art method of random elimination of data points is used to thin the point cloud. FIG. 6, however, depicts the point cloud 10 thinned in accordance with the teachings of the present disclosure. As can be seen, there is an increased level of detail closer to the user's point of view 20.

The method 100 may preferably be implemented in a computing system, which can include a personal computer, a workstation, a network computer, a hand held computer, or any other computing system. Further, the system can be written as a software program in any appropriate computer language.

The system includes a processing device, which can be any computer processing unit, and could be a single central processing unit, or a number of processing units configured to operate either in sequence or in parallel. The processing device can be configured to execute software processes which implement the steps disclosed herein. The system will also include a memory capable of storing the steps necessary for a processing device to implement the steps disclosed herein. This memory could be in the form of memory resident within the processing device or in the form of standalone memory coupled to the processing unit via a communication path, such as a bus or a network.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method to produce a thinned point cloud from an original point cloud based upon a point of view of an imaging device used to generate the original point cloud, the method using a computing system, the method comprising the steps of:

determining the point of view of the imaging device ("pov");

calculating a number of points in the original point cloud ("numPoints");

determining an amount of free memory of the computing system ("freeMem");

determining the minimum ("minDist") and maximum ("maxDist") distance from the point of view of the camera to the data points in the point cloud;

calculating a difference between the minimum and maximum distance ("ΔDist");

calculating a mean number of points to keep based upon the amount of free memory ("numKeep"), whereby numKeep=numPoints/freeMem/constant(1);

generating the empty thinned point cloud; and populating the thinned point cloud with a subset of data points from the original point cloud according to the following algorithm:

for each data point ("d") in the original point cloud,
$d^2$=(distance from d to pov)$^2$;
skipRatio=$(d^2-minDist^2)\Delta Dist^2$*numKeep*constant (2);
dSkip=1.0/(skipRatio+1.0);
if (dSkip>rand( )){add d to thinned point cloud}.

2. A method of thinning a point cloud generated by an imaging device, the method comprising:

determining a point of view of the imaging device;

for each data point in the point cloud, keeping the data point in the thinned point cloud based upon the distance of the data point to the point of view;

wherein keeping the data point in the thinned point cloud comprises calculating a distance from the data point to the point of view, calculating a skipRatio between 0 and 1 based upon the distance, and keeping the data point if the skipRatio is greater than a random number.

3. The method of claim 2 further comprising:

determining a minimum distance from the point of view to all data points in the point cloud; and whereby the skipRatio is calculated based upon the minimum distance.

4. The method of claim 2 further comprising:

determining a maximum distance from the point of view to all data points in the point cloud; and whereby the skipRatio is calculated based upon the maximum distance.

5. The method of claim 2 whereby the skipRatio is calculated using the formula:

skipRatio=$(d^2-minDist^2)/\Delta Dist^2$*numKeep*constant (2);

whereby d represents the distance from the data point to the point of view, minDist represents the minimum distance from the data points to the point of view, ΔDist represents the difference between minDist$^2$ and the maximum distance$^2$ from the data points to the point of view, numKeep represents the number of data points to keep in the thinned point cloud and constant(2) is a constant number.

6. The method of claim 2 implemented on a computing system whereby deciding whether to keep the data point in the thinned point cloud is also based upon the total available memory of the computing system.

7. The method of claim 2 whereby the point cloud is acquired by LIDAR.

8. The method of claim 2 whereby the data points closest to the point of view are included in the thinned point cloud.

9. The method of claim 2 whereby the data points furthest from the point of view are excluded from the thinned point cloud.

10. A system for thinning a point cloud generated by an imaging device, the system comprising:

a storage module for storing the point cloud; and a computer processing unit for thinning the point cloud whereby the computer processing unit is configured to perform the steps of:

determining a point of view of the imaging device; and for each data point in the point cloud, keeping the data point in the thinned point cloud based upon the distance of the data point to the point of view;

wherein keeping the data point in the thinned point cloud comprises calculating a distance from the data point to the point of view, calculating a skipRatio between 0 and 1 based upon the distance, and keeping the data point if the skipRatio is greater than a random number.

11. The system of claim 10 whereby the steps performed by the computer processing unit further comprises the steps of:

excluding from the thinned point cloud a plurality of data points furthest from the point of view.

12. The system of claim 10 whereby the steps performed by the computer processing unit further comprises the steps of:

including in the thinned point cloud a plurality of data points closest to the point of view.

* * * * *